May 13, 1924.
F. RAMSTEAD
AWNING SLIDE
Filed Oct. 26, 1922
1,494,284
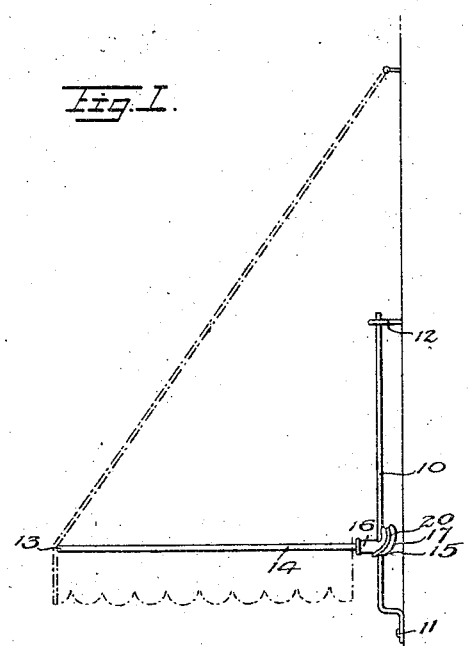
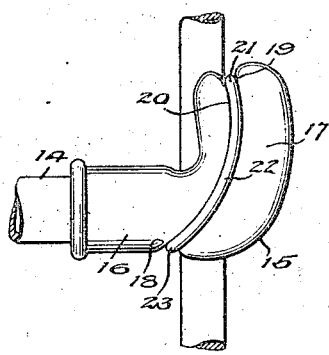
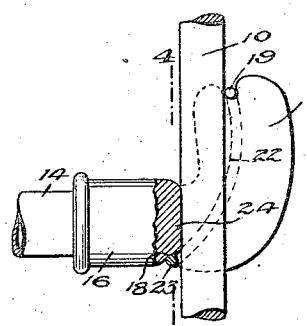
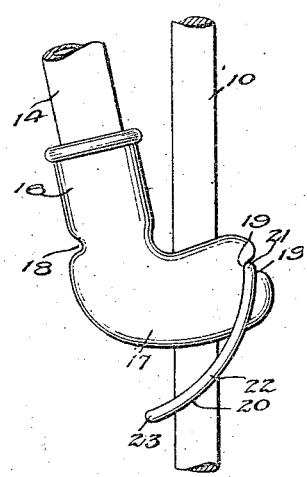
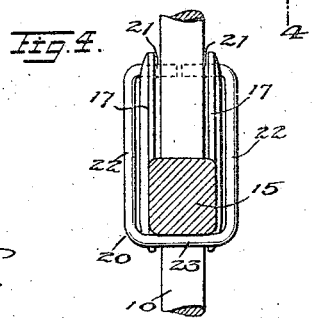
WITNESSES
H. T. Walker
Hugh H. Ott
INVENTOR
Fred Ramstead
BY
ATTORNEYS Patented May 13, 1924.

1,494,284

UNITED STATES PATENT OFFICE.

FRED RAMSTEAD, OF NEW YORK, N. Y.

AWNING SLIDE.

Application filed October 26, 1922. Serial No. 597,116.

*To all whom it may concern:*

Be it known that I, FRED RAMSTEAD, a subject of the King of Sweden, and a resident of the city of New York, borough of Manhattan, in the county and State of New York, have invented a new and Improved Awning Slide, of which the following is a full, clear, and exact description.

The present invention has relation to awning hardware and has particular reference to an improvement in the means of connection between the awning frame and the slide rod.

As an object the invention contemplates a combined awning frame tip and slide which greatly facilitates the connection and disconnection of the frame with the slide rod and which operates when the awning is lowered to grip the slide rod for preventing relative movement therebetween, while at the same time admitting of the free sliding movement of the frame with respect to the slide rod when raising or lowering the awning.

The invention further contemplates an improved connection between the awning frame and slide rod which eliminates cotter pins, nuts, or screws that are ordinarily employed where cotter slides, nut slides or jaw slides are used.

As a still further object the invention provides a device of the character described which is extremely simple in its construction, inexpensive to manufacture, and which is thoroughly reliable and highly efficient for the purpose for which it is intended.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawing—

Figure 1 is a side view illustrating the use and application of the invention.

Fig. 2 is a fragmentary enlarged detail view illustrating the awning frame in lowered position with respect to the slide rod.

Fig. 3 is a similar view with parts in section.

Fig. 4 is a fragmentary transverse sectional view taken approximately on the line 4—4 of Fig. 3.

Fig. 5 is a fragmentary enlarged detail side view illustrating the mode of connecting or disconnecting the awning frame with the slide bar.

Referring to the drawing by characters of reference, 10 designates an awning slide bar which is connected as at 11 at its lower end to the window frame or other part of the building adjacent the window and which is preferably connected by a screw eye 12 at its upper end. The awning frame 13 which is of substantially U-shaped construction in plan is provided with spaced side arms 14 which are designed to be connected with the slide bar 10 for sliding and swinging movement with respect thereto. At the present time the free ends of the arms 14 are provided with apertured tips which are fitted over the trunnions of cotter or nut slides and secured in place by cotter pins or nuts which are inserted between the spaced ears of jaw slides with a bolt or screw inserted therethrough. When it is desired to connect the awning frame or disconnect the same from the slides, the nut, cotter pin, bolt, or screw is removed, which operation requires a considerable length of time and often results in the loss of the cotter pin, nut, bolt or screw which of necessity must be replaced. In these common forms of connection, the slide is free to move up and down on the slide rod which in windy weather causes a constant rattling and vibration of the awning.

To overcome the above recited objections, the present invention resides in the provision of a combined awning frame tip and slide designated generally at 15 which consists of a socket portion 16 for the reception of the extremities of the side arms 14 of the awning frame. At the free end of the socket, a pair of right angularly disposed parallel jaws 17 are provided which have formed at their juncture with the socket portion notches 18 and at their upturned free ends recesses or notches 19. A lock ring 20 of substantially oblong formation is used in combination with the improved connecting element which is split at its upper bight portion to provide a pair of inturned trunnions 21. The side arms 22 of the lock ring 20 are curved or arcuate as illustrated in order that the lower solid bight portion 23 and the trunnions 21 may properly engage respectively in the notches 18 and recesses 19 when the frame and slide rod are connected.

The lock ring 20 permanently embraces the slide rod 10 and always remains thereon when the awning frame is disconnected from the slide rod. To apply the frame to the slide rod, the recesses 19 of the jaws 17 are engaged with the trunnions 21 in substantially the manner illustrated in Fig. 5 while the frame is in a substantially vertical or parallel position to the slide rods. The frame is then lowered to a substantially horizontal position, thus forcing the lower bight 23 over the lower portion of the jaws 17 until the bight 23 snaps into the notches 18. The connection between the frame and slide rod is then completed and when the awning is in lowered position with the frame in a substantially horizontal position, it will be obvious that the weight of the frame, using the end 24 of the socket as a fulcrum will impinge the trunnions 21 against the slide rod to frictionally maintain the awning frame against relative movement on the slide rod. When the awning is to be raised, the swinging of the frame to a substantially vertical position will allow for the free sliding movement of the connection over the slide rod. When it is desired to disengage the side arms of the awning frame from the slide rod, the lower bight 23 is forced over the lower end of the jaws 17, thus freeing the bight 23 from the notches and permitting of the disengagement of the trunnions 21 from the recesses 19. The simplicity of the construction, operation and manner of engaging and disengaging the elements with each other is thought to be clearly obvious and of decided advantage over the present devices now in use.

I claim:

1. A device for connecting an awning frame with the slide rods, comprising a member secured to one of the awning frame terminals, said member having an angularly disposed bifurcated terminal, the furcations of which embrace the slide rod, said furcations having notches at their opposite ends disposed at opposite sides of the slide rod, and a locking element of substantially link form, the opposite bights of which are engaged in the notches and encircle the slide rod.

2. A device for connecting an awning frame with the slide rods, comprising a member secured to the awning frame terminals, said member having an angularly disposed bifurcated terminal, the furcations of which embrace the slide rod, said furcations having notches at their opposite ends disposed at opposite sides of the slide rod, and a locking element of substantially link form, the opposite bights of which are engaged in the notches and encircle the slide rods, one of said bights being split transversely to permit of the removal or application of the locking element to the slide rod.

3. A device for connecting an awning frame with slide rods, comprising a socketed member having a bifurcated angularly disposed terminal, the furcations of which are adapted to embrace the slide rod, said furcations having notches at their opposite ends disposed at opposite sides of the slide rod, and a lock ring the opposite ends of which are engaged in the notches and encircle the slide rod.

4. A device for connecting an awning frame with slide rods, comprising a socketed member having a bifurcated angularly disposed terminal, the furcations of which are adapted to embrace the slide rod, said furcations having notches at their opposite ends disposed at opposite sides of the slide rod, and a lock ring the opposite ends of which are engaged in the notches and encircle the slide rods, one of the ends of said lock ring frictionally engaging the slide rod when the awning is in lowered position to constitute means for locking the awning frame against relative movement with respect to the slide rod.

FRED RAMSTEAD.